United States Patent [19]

Walker

[11] 4,147,131

[45] Apr. 3, 1979

[54] ELEVATED AQUARIUM TANK

[75] Inventor: Gentle J. Walker, Detroit, Mich.

[73] Assignee: Paul C. Harvey, Detroit, Mich.; a part interest

[21] Appl. No.: 788,275

[22] Filed: Apr. 18, 1977

[51] Int. Cl.² ............................................. A01K 64/00
[52] U.S. Cl. ..................................................... 119/5
[58] Field of Search ................................. 119/5, 3, 15; D30/6-12

[56] References Cited

U.S. PATENT DOCUMENTS

| 164,074 | 6/1875 | Chase | 119/5 |
|---|---|---|---|
| 165,639 | 7/1875 | Wenmacker | 119/5 |
| 2,028,913 | 1/1936 | Neumann | 119/5 |
| 3,958,534 | 5/1976 | Perkins et al. | 119/15 |

*Primary Examiner*—Hugh R. Chamblee

*Attorney, Agent, or Firm*—Hauke and Patalidis

[57] ABSTRACT

An elevated aquarium tank comprising at least a pair of superimposed spaced apart compartments or chambers, and conduit means placing the lower chamber in communication with the upper chamber. After the aquarium tank is filled with water such that the lower chamber and the conduits are entirely filled with water, and the upper chamber is filled to an appropriate level, fish placed in the aquarium are able to swim from the lower to the upper chamber, and vice versa, through the conduits. The space between the panels forming the top of the lower chamber and the panel forming the bottom of the upper chamber forms a display shelf for art objects, flowers, plants, pictures and the like or, alternatively, the space may be enclosed entirely or partially with a lattice or grillwork and form a bird cage.

6 Claims, 7 Drawing Figures

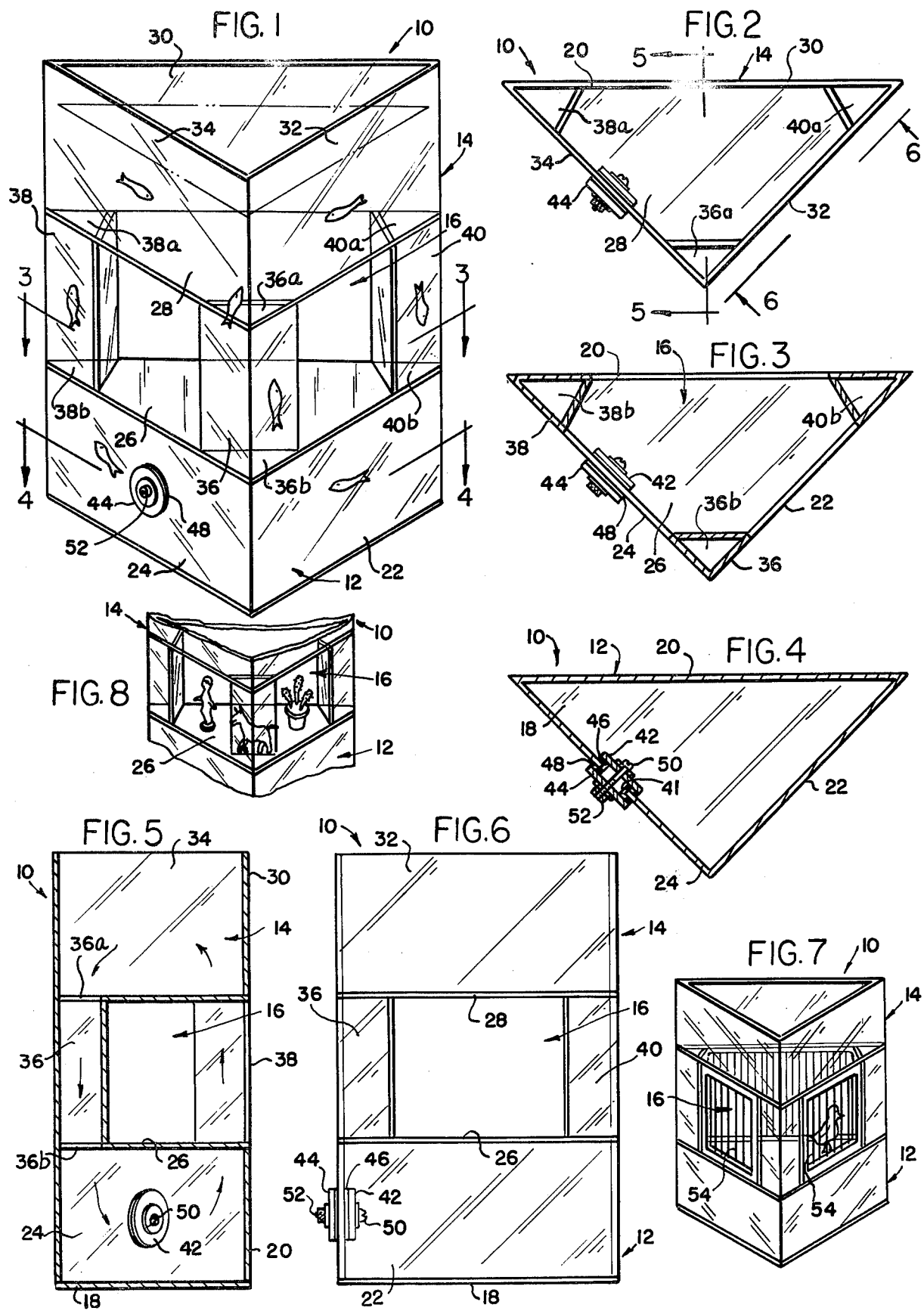

ELEVATED AQUARIUM TANK

BACKGROUND OF THE INVENTION

The present invention relates in general to an aquarium for displaying fish, and more particularly to an aquarium comprising at least a pair of superimposed spaced apart compartments or chambers placed in communication by means of appropriate hollow pillars or conduits.

Aquariums for displaying fish are becoming more and more a part of home furnishings. Such aquariums are generally made of a transparent material, such as glass and the like, in the form of a parallelepipedonal tank filled with water to an appropriate level and in which more or less exotic fish are displayed generally in a decor imitating an underwater scenery. Appropriate water filtering and aeration systems are used to continuously cleanse the water and such as to remove from the water solid particles and algea that may cloud the water. In addition, diverse accessories such as an air pump to continuously dissolve air in the water by bubbling, illuminating devices and thermostat actuated water warming elements may be placed in the aquarium.

Because of their box-like appearance, aquariums are generally not very ornamental, and they cannot be used for any purpose other than displaying fish in an appropriate scenery.

The present invention remedies the inconveniences of prior art aquariums by providing a tank of original shape permitting to display fish in an interesting manner, and having more ornamental appeal than the common parallelepipedonal tank, or the cylindrical or spherical fish bowl.

SUMMARY OF THE INVENTION

The present invention accomplishes its objects by providing a compartmented aquarium tank consisting of a structure providing at least a pair of superimposed separate enclosures, made of transparent material, and interconnected by substantially vertically disposed hollow pillars or conduits interconnecting one enclosure with the other, such as to provide passageways for fish to swim from the lower to the upper enclosure, and vice versa. In addition, the present invention provides between the pair of superimposed enclosures or compartments a shelf on which art objects may be displayed or which may be partially enclosed, or entirely enclosed, with apertured or grillwork panels such as to provide a cage for an animal, such as a bird.

BRIEF DESCRIPTION OF THE DRAWING

The many objects and advantages of the present invention will become apparent to those skilled in the art when the following description of the best modes contemplated for practicing the invention is read in conjunction with the accompanying drawing wherein:

FIG. 1 is an isometric view of a structural example of an aquarium tank according to the present invention;

FIG. 2 is a top plan view thereof;

FIG. 3 is a section along line 3—3 of FIG. 1;

FIG. 4 is a section along line 4—4 of FIG. 1;

FIG. 5 is a longitudinal section along line 5—5 of FIG. 2;

FIG. 6 is a side elevation view from line 6—6 of FIG. 2; and

FIGS. 7 and 8 are views similar to FIG. 1 and illustrating two different embodiments for the use of the display shelf provided by the invention.

DETAILED DESCRIPTION OF THE PREFERRED EMBODIMENTS

Referring now to the drawing and more particularly to FIGS. 1-3 and 5-6, an aquarium tank 10 according to the present invention is in the general form of, preferably, a pyramid made of glass plates cut to shape and size and having their edges adequately beveled to insure proper joint fitting. The abutting surfaces at the joints are cemented together by way of an appropriate colorless sealant-adhesive, readily available on the market, or they are heat-fused together. Alternatively, the structure of the aquarium tank 10 of the invention may be made of a glass molding, in a single piece, or of separate individual glass moldings assembled together by means of sealant-adhesive or fused together at their abutting surfaces. Alternatively, the aquarium tank 10 may be made of transparent plastic, such as for example an acrylic plastic, in the form of panels cut to shape and size and assembled together by means of an appropriate solvent, or it may be made of a single molding or of separate moldings assembled together by way of an appropriate solvent. If so desired, all the edges of the structure may be provided with a metallic corner molding, or the like, not shown.

Whatever the method of construction which is adopted, the aquarium tank 10 of the invention comprises essentially a pair of separate enclosures 12 and 14, disposed one above the other in spaced relationship so as to leave an open area 16 therebetween. In the example of structure illustrated, both the lower enclosure or chamber 12 and the upper enclosure or chamber 14 are in the form of an isosceles triangle, in transverse cross section, although it will be appreciated that any other shape may be adopted such as a rectangular shape, or a round or oval shape. The lower enclosure or chamber 12 has a triangular bottom wall 18 and three sidewalls designated respectively by numerals 20, 22 and 24. The lower enclosure or chamber 12 is further provided with a triangular, in the structure illustrated, top wall 26, fastened to the top edge of the sidewalls 20, 22 and 24.

The upper enclosure or chamber 14 is similarly triangular-shaped, with the same cross area dimensions as the lower enclosure or chamber 12, and is provided with a bottom wall 28 and with sidewalls 30, 32 and 34. The upper enclosure or chamber 14 is supported in spacial relationship from the lower enclosure or chamber 12 by way of three vertically disposed triangular-shaped hollow columns or pillars 36, 38 and 40. The support columns or pillars 36, 38, and 40 are open at both ends, and their ends are fitted in apertures such as apertures 36a, 38a and 40a disposed in the bottom wall 28 of the upper enclosure or chamber 14 and in corresponding apertures 36b, 38b and 40b formed through the top wall 26 of the lower enclosure or chamber 12, such that the hollow columns or pillars 36, 38 and 40 form conduits placing in communication the lower enclosure or chamber 12 and the upper enclosure or chamber 14. In this manner, after filling the lower enclosure or chamber 12 and the upper enclosure or chamber 14 with water to an appropriate level in the chamber 14, fish, or any other water animals may swim from the upper enclosure or chamber 14 to the lower enclosure or chamber 12, and vice versa, through any one of the conduits formed by the hollow support pillars or columns 36, 38 and 40.

Because of its open top structure, the enclosure or chamber 14 can be easily cleaned and manually scrubbed, after emptying the aquarium 10 and obviously transferring the fish to another aquarium or tank, but being enclosed on all sides, with the exception of the apertures 36b, 38b and 40b, the lower enclosure or chamber 12 cannot be readily reached in every area for manual scrubbing. To remedy this, an access aperture 41, best shown at FIG. 4, is disposed in one of the sidewalls of the lower compartment or chamber 12, for example through the sidewall 24. The access aperture 41 is preferably round and is normally obturated by means of a pair of disks 42 and 44, made of plates of material such as glass or the like, the material being preferably the same as the material of which the whole structure of the aquarium tank 10 is made. Each disk 42 and 44 is provided proximate its edge with an annular resilient gasket as shown at 46 and 48, respectively, the two disks 42 and 44 being clamped in position over the access aperture 41 by means of a bolt 50 and nut 52 arrangement. Appropriate sealing compound is used to coat part of the body and the head of the bolt 50, and resilient and sealing washers are passed over the bolt 50 below its head and below the nut 52. In this manner, by loosening the nut 52, the disk 44 may be removed from over the access aperture 41, and the disk 42 dropped inside of the enclosure or chamber 12, the access aperture 41 affording passage for a hand to permit cleaning and scrubbing of the interior surface of the walls of the enclosure or chamber 12.

As shown at FIG. 7, the open area or space 16 may be entirely enclosed by means of a lattice or grillwork, such as shown at 54, or partially so enclosed and partially enclosed with solid panels made of glass or of any other material, preferably the same material as the remaining of the structure. In this manner birds or small animals may be displayed in the space 16, which gives rise to the interesting and ornamental arrangement presented by, for example, a bird being surrounded by swimming fish.

FIG. 8 illustrates another arrangement whereby the space 16 is used as a display area for bibelots, statuettes, flowers, plants, framed photographs or paintings, and the like.

Although the present invention has been illustrated and described as consisting of a pair of spaced apart communicating enclosures or chambers, it will be appreciated that a multi-tier structure may be made according to the principle of the invention. For example, three, four or more superimposed enclosures or compartments may be disposed on top of each other, each one being placed in communication with the enclosure disposed immediately above or immediately below by means of appropriate conduits, and leaving an open shelf area between consecutive enclosures or compartments, such as to provide a multi-tier interconnected aquarium tank display combined with open areas between enclosures or compartments, which may remain open as display areas, or be used as cages for birds or other animals.

Having thus described the present invention by way of a typical structural embodiment thereof, modifications whereof will be apparent to those skilled in the art, what is claimed as new is as follows:

1. A multi-tier aquarium comprising at least a pair of superimposed spaced apart aquarium tanks, the lower of said tanks having a bottom wall, a top wall and sidewalls, and the higher of said tanks having a bottom wall and sidewalls, and at least one hollow pillar supporting the higher of said tanks above and in spaced relationship relative to the lower of said tanks, said bottom wall of the higher of said tanks having an aperture and said top wall of the lower of said tanks having an aperture, said apertures placing said upper chamber and said lower chamber in communication through said hollow pillar.

2. The aquarium of claim 1 wherein said pair of tanks form therebetween a partially enclosed space defining a cage for small live animals.

3. The aquarium of claim 1 wherein said tanks are of equal triangular cross-sectional areas.

4. The aquarium of claim 3 wherein three of said hollow pillars are provided, each having a triangular cross-section and disposed at a corner of said aquarium, and each placing said pair of tanks in communication.

5. The aquarium of claim 1 further comprising an access aperture disposed in a sidewall of the lower of said tanks, said access aperture being normally obturated by a hermetic cover.

6. The aquarium of claim 5 wherein said hermetic cover comprises a first plate disposed inside of the lower of said tanks and overlapping said aperture, a second plate disposed outside of said tank and overlapping said aperture, a gasket disposed proximate the edge of each of said plates in engagement with the surface of said sidewall, and clamping means urging said plates towards each other in clamping engagement with said surface at said edge of said aperture.

* * * * *